Oct. 9, 1956  IN MEEI NEOU  2,765,981
MECHANICAL INTEGRATOR
Filed June 20, 1955  5 Sheets-Sheet 1

INVENTOR.
IN MEEI NEOU

Oct. 9, 1956    IN MEEI NEOU    2,765,981
MECHANICAL INTEGRATOR
Filed June 20, 1955    5 Sheets-Sheet 2
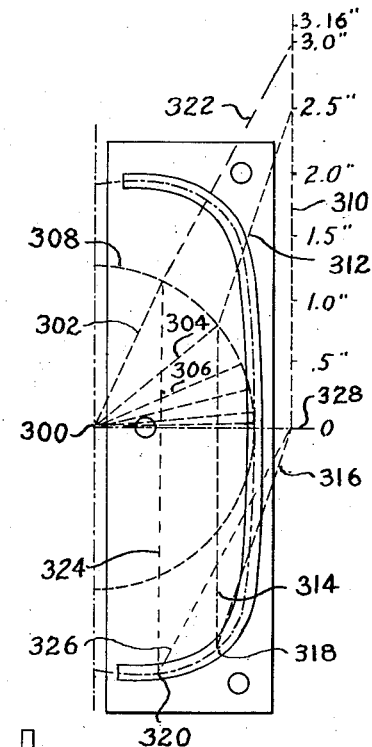
Fig. 4
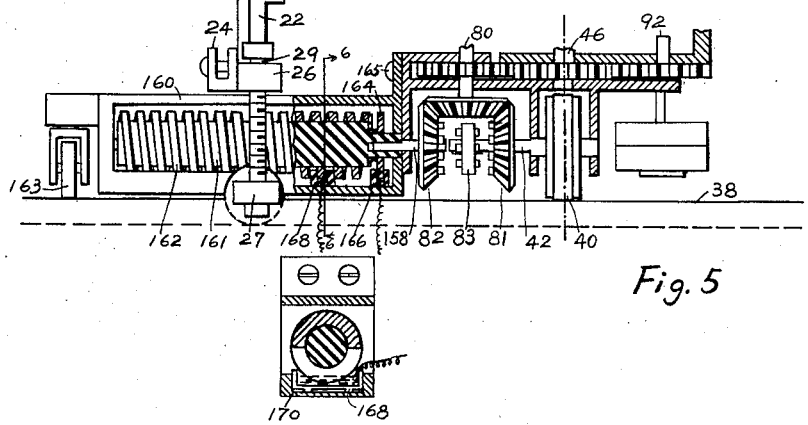
Fig. 5
Fig. 6
INVENTOR.
IN MEEI NEOU
BY

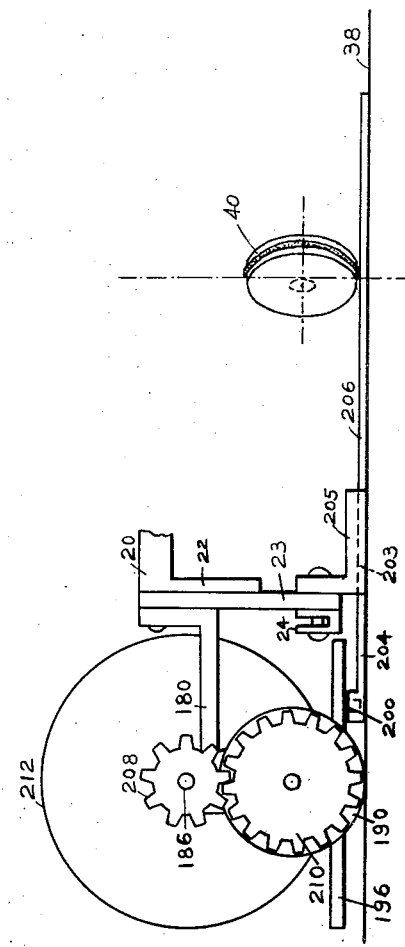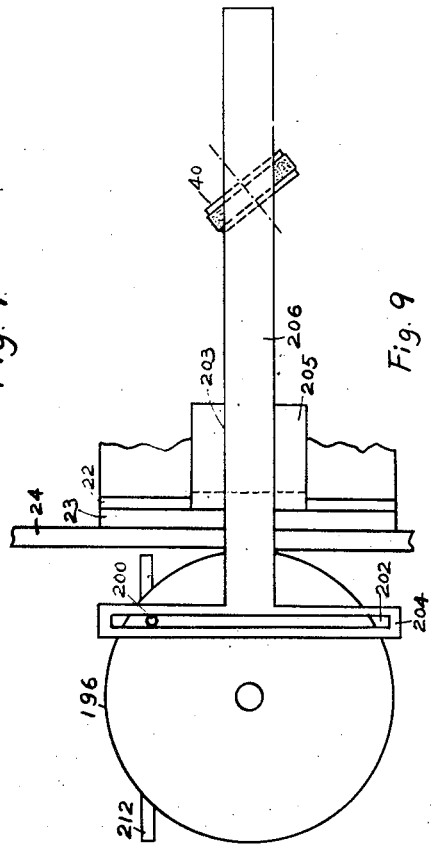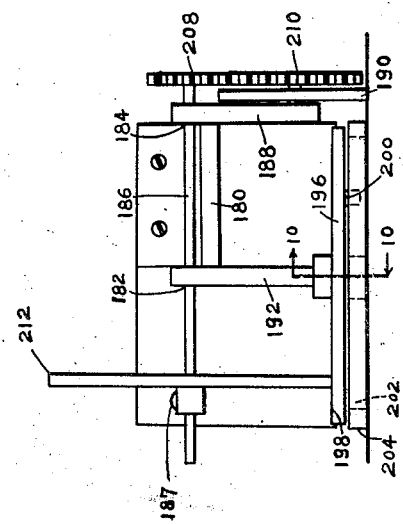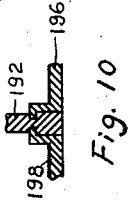
Fig. 7
Fig. 9
Fig. 8
Fig. 10
INVENTOR.
IN MEEI NEOU Oct. 9, 1956      IN MEEI NEOU      2,765,981
MECHANICAL INTEGRATOR Filed June 20, 1955      5 Sheets-Sheet 4

INVENTOR.
IN MEEI NEOU
BY

Oct. 9, 1956                IN MEEI NEOU                2,765,981
                         MECHANICAL INTEGRATOR
Filed June 20, 1955                                  5 Sheets-Sheet 5

INVENTOR.
IN MEEI NEOU
BY

United States Patent Office 2,765,981
Patented Oct. 9, 1956

2,765,981

MECHANICAL INTEGRATOR

In Meei Neou, Syracuse, N. Y.

Application June 20, 1955, Serial No. 516,686

9 Claims. (Cl. 235—61)

This invention relates to a mechanical integrator, and more particularly to a multi-purpose integrator and integraph adapted to evaluate area, moment, moment of inertia of irregular configurations, and Fourier coefficients.

An object of the invention is to provide an integrator adapted to trace a curve of any regular or irregular figure and perform the integration of $$I_1 = \int \phi(y) dA$$

where A is the area under the curve, and $\phi(y)$ is an analytic function of $y$. By assuming $\phi(y)$ to be a constant, $y$, $y^2$ etc., the device is capable of use to determine the area, moment $\int (y) dA$, or moment of inertia of area $\int y^2 dA$ etc. of irregular configurations.

Another object of the invention is to provide an integrator capable of continuously plotting the integration results mechanically.

A further object of the invention is to provide an integrator adapted to record the results electrically.

A still further object of the invention is to provide an integrator capable of evaluating Fourier coefficients from a given curve.

Still another object of the invention is to provide an integrator adapted to mechanically perform the integration of the product of two functions which can be expressed as follows, $$I_2 = \int \phi_1(x) \phi_2(x) dx$$

where $\phi_1(x)$ and $\phi_2(x)$ are given in the form of curves.

The above and other novel features of the invention will appear more fully hereinafter from the following detailed description when taken in conjunction with the accompanying drawings. It is expressly understood that the drawings are employed for purposes of illustration only, and are not designed as a definition of the limits of the invention, reference being had for this purpose to the appended claims.

In the drawings wherein like reference characters indicate like parts:

Figure 4 is a diagrammatic showing of the method of deriving a cam profile;

Figure 5 is a fragmentary sectional view of a modified form employing an electrical indicator;

Figure 6 is a transverse sectional view of Figure 5 taken substantially on the line 6—6 of Figure 5;

Figure 7 is a side elevational fragmentary view of the apparatus provided with an attachment for evaluating Fourier coefficients;

Figure 8 is an end view of the apparatus with the attachment of Figure 7;

Figure 9 is a bottom fragmentary plan view of the apparatus with the attachment of Figures 7 and 8;

Figure 10 is a fragmentary sectional detail view taken substantially on the line 10—10 of Figure 8;

Figures 1, 2, 3:
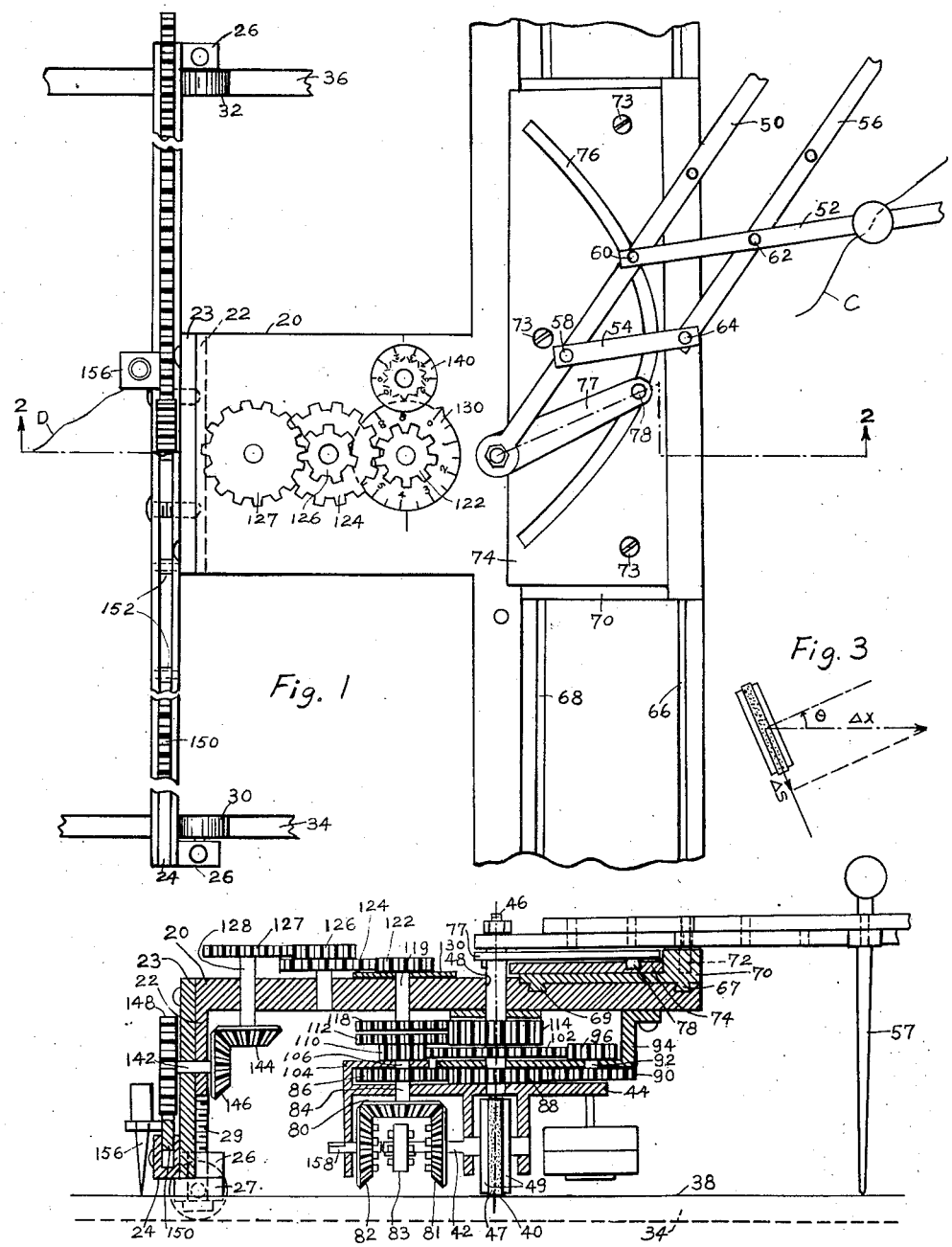
Figure 1 is a plan view of the integrator, track and plotting board.
Figure 2 is a sectional view of the integrator taken substantially on the broken line 2—2 of Figure 1.
Figure 3 is a diagrammatic showing of the relation between the carriage travel and the rotation of the integrating wheel.

Referring to the drawings, and more particularly Figures 1 and 2, the integrator comprises a carriage having a main frame member 20 of T shape, the carriage having a depending skirt 22 at its rear, to which is affixed a skirt plate 23, which has affixed adjacent its lower edge, a transverse channel member 24. The channel member at opposite ends is provided with brackets 26, having bearing blocks 27 on each of which there is journalled wheels 30 and 32 adapted to engage grooved runways 34 and 36 along the upper and lower edges of a chart supporting board 38. The blocks are secured to the brackets 26 by screws 29, which provide for vertical adjustment. The grooved runways may cooperate with the wheels 30 and 32 to enforce rectilinear movement of the carriage, or any other suitable means can be provided.

Beneath the forward end of the carriage is a recording wheel 40 adapted to frictionally engage the board or chart, and such wheel and the wheels 30 and 32 provide a three point support for the carriage. The recording wheel 40, is mounted on and affixed to a shaft 42 journalled in a swivelled bracket 44, such bracket having a vertical spindle 46, extending upwardly therefrom and through a supporting bearing 48 in the frame member 20. The wheel comprises a soft rubber disc 47 clamped between supporting metal discs 49, the periphery of the rubber disc being adapted to engage the board or chart for frictional drive. The central plane of the rubber disc lies on the axis of the spindle 46.

As the carriage is moved rectilinearly along the $x$ axis, which extends parallel with the runways 34 and 36, the wheel 40 is caused to rotate in accordance with the sine of the angle $\theta$, see Figure 3, the angle $\theta$ being the angle between the wheel axis and the $x$ axis, the direction of carriage movement. The increment of peripheral travel or rotation of the wheel, $\Delta s$ corresponds to the product of sine $\theta$ and the increment of travel of the carriage, $\Delta x$.

The upper end of the spindle has freely pivotally mounted thereon, an arm 50 of a pantograph linkage, such linkage comprising a tracing arm 52, and parallelogram links 54 and 56. The arm 52 is provided with a tracing stylus 57, adapted to be moved along a curve such as C on a chart mounted on the board 38. The links 54 and 56, and the arms 50 and 52 are provided with pivot 58, 60, 62 and 64, and the link 56, and arms 50 and 52 are provided with apertures at suitably spaced distances, whereby the linkage may be altered to provide different ratios of movement between the stylus, and the pin 64, which acts as an operating pin.

On the forward portion of the frame 20, are provided transverse guide grooves 66 and 68 adapted to coact with corresponding ribs 67 and 69 of a cam supporting slide plate 70, which slide plate is constrained to move transversely of the carriage on the frame 20. The slide plate 70 is provided with an aperture 72 into which the pivot pin 64 of the parallelogram linkage extends, whereby upon lateral movement of the stylus 57, the slide plate 70 is caused to move laterally of the carriage in direct proportion to the movement of the stylus transversely of the x axis. It will be seen that the locus of the movement of the pin 64 is on a line extending transversely of the carriage, and that the stylus is confined to movement parallel therewith.

Detachably secured upon the slide plate 70 by screws 73 is a cam plate 74, having a cam groove 76 therein of a profile which may be determined analytically. The spindle 46 is provided with a cam follower arm 77 affixed thereto, such arm having a cam follower pin 78, adapted to ride in the cam groove 76 and follow the profile. As the stylus 57 is moved laterally from the axis in tracing a curve C, the slide plate 70, and cam plate 74 is moved proportionally, causing the cam groove 76 to swing the arm 77. The arm rotates the wheel bracket, varying the angle of the plane of the wheel in respect to the axis $x$ through angle $\theta$ (see Figure 3). When the stylus lies upon the axis $x$, the plane of the wheel is at right angles thereto, so that as the carriage is moved along the board, the friction force between the board or chart and wheel has no component acting on the wheel periphery tending to rotate the wheel. As the stylus is moved away from the axis $x$, the cam groove 76 causes the arm 77 to swing, effecting a change in the angular relation between the plane of the wheel and the axis $x$. Thus on movement of the carriage, there is a component of the friction force between the wheel and the board acting to rotate the wheel, the component varying with the angular relationship and the sine of the angle $\theta$.

As the carriage is moved in response to the stylus 57 in tracing a given curve such as C (Figure 13), the marker 156 traces a curve D which is representative of the integral of the curve C.

The rotation of the wheel 40 may be recorded electrically as will be hereinafter described, or may be transmitted mechanically to an indicator mechanism on the carriage through a planetary gear train capable of transmitting the actual rotation of the wheel 40 while eliminating angular movement of the wheel supporting bracket 44 and spindle 46.

The gear train comprises a bevel gear 80 affixed to a vertical shaft 84 journalled in the bracket 44. The bevel gear 80, is adapted to be driven by either of the bevel gears 81 or 82 in mesh therewith, there being provided a jaw clutch collar 83, splined on the shaft 42, adapted to be engaged with complementary jaw clutch teeth on either of the bevel gears 81 and 82, to provide for reversing the drive. The bevel gears 81 and 82 may be mounted to rotate free in respect of the shaft 42, one or the other being coupled to the shaft by the jaw clutch. For reasons which will appear hereinafter, the gear 82 is fixed to a stub shaft 158, in alignment with shaft 42.

The shaft 84 has keyed thereto a gear 86 meshing with a gear 88 freely rotating on the spindle 46, and in turn meshing with a gear 90 fixed on a shaft 92 journalled in an offset bracket 94 mounted on the frame 20. The gears 86, 88 and 90 are of like diameter and number of teeth.

On the shaft 92 is affixed a gear 96 meshing with a large gear 102 freely pivoted on the spindle 46, the gears 102 and 96 having a diameter and number of teeth ratio of 2 to 1. On an extension 104 of the bracket 44 is a stub shaft 106, on which is journalled a step gear, the lower or smaller gear 110 meshing with the large gear 102, and having a diameter and number of teeth ratio of 1 to 2. The upper larger gear 112 of the step gear meshes with a gear 114, freely journalled on the spindle 46. The gear 114 also meshes with a gear 118 affixed to a shaft 119 journalled in and extending upwardly through the frame 20. The gears 114 and 112 are of like diameter and number of teeth. For example, gears 86, 88, 90, 112, 114 and 118 may all have 30 teeth, and be of the same diameter, while gears 96 and 110 would have 20 teeth, and gear 102 would have 40 teeth, assuming the same tooth pitch to be used for all gears.

The shaft 119 carries a dial indicator 130, which advances on each revolution a second dial indicator 140. The shaft 119 drives shaft 128 through gears 122, 124, 126 and 127, journalled in the frame 20.

In order to plot the indications continuously on the chart, the shaft 128, extends below the frame, and transmits the rotation thereof to a horizontally disposed shaft 142, through bevel gears 144 and 146. The shaft 142 in turn carries a pinion 148, meshing with a rack 150, which is slidably disposed on spaced rollers 152, in the channel guide 24 which is affixed to the plate 23. The rack carries a tracing pen 156 for continuously plotting an output curve such as D.

The planetary gearing may be eliminated by employing an electrical variable resistance indicator as shown in Figure 5. In the modification there shown, the bevel gear 81 is free on shaft 42, with the jaw clutch element splined on the shaft. The bevel gear 82 is keyed to the stub shaft 158 extending into a bracket extension 160, the extension being secured in place by screws 165. When the jaw clutch engages bevel gear 81, bevel gear 82 is rotated reversely through bevel gear 80 and when the jaw clutch engages bevel gear 82, direct drive to shaft 158 results.

The shaft 158 extends into the bracket extension, and has mounted thereon an insulating drum 161 having a calibrated helical resistor wire or element 162, one end of which is connected to a slip ring 164. A mercury cup 166 makes contact with the slip ring 164, while a similar mercury cup 168, mounted to slide lengthwise in a guide-way 170, makes contact with the helical resistor wire 162. The mercury cup 168 is of non-conductive material. As the drum rotates, the cup 168 is moved along the guide-way in accordance with the rotation of the friction wheel 40. Flexible connectors, not shown, to the mercury pools in each of the cups 166 and 168 complete a circuit to an electrical indicator (not shown). The bracket extension 160 may be provided with a swivel roller 163, which is free to roll in any direction so as to provide support for the bracket.

When the electrical indicator is employed, the plate 23 is mounted on the bracket 22 in an elevated position as shown in Figure 5, so as to support the channel high enough to allow the bracket extension to swing freely thereunder. The wheels 30 and 32 are adjusted by extending the screws 29, also as shown. The rack pinion 142 and its shaft may be removed so as to be out of the way, and the gear 96 may be removed from the shaft 92, so as to disconnect a substantial portion of the planetary gearing.

To evaluate Fourier coefficients, there may be applied to the apparatus of Figures 1 and 2 an attachment providing for harmonic analysis. In Figure 7 the frame 20 is shown as having a bracket 180 attached to the rear skirt 22 and plate 23, the bracket having spaced bearings, 182 and 184 for a transverse shaft 186. The bracket also has a depending arm 188 providing a bearing support for a board engaging friction drive wheel 190, and a depending stub shaft 192, on the lower end of which is rotatably mounted a disc 196. The disc has a friction face 198 on the upper side, and a crank pin 200 projecting from the underside, the crank pin engaging the transverse slot 202 of a Scotch yoke 204. The stem of the Scotch yoke is guided and, slidably mounted in a groove 203 in a foot extension 205 which may be attached to the lower marginal portion of the plate 23. The stem extends forward in the form of a flat tongue 206 and is adapted to underly the roller 40.

The shaft 186 which is driven from the friction wheel 190 through gears 208 and 210 has affixed on its other end a friction drive wheel 212, the peripheral edge of which engages the friction face 198 of the disc 196. The drive wheel may be adjusted to different positions on the shaft 186 by loosening the set screw 187 so as to provide any desired driving ratio between the drive wheel and the friction disc.

It will be seen that as the carriage moves forward during the tracing of a curve such as C by the stylus 57, the friction wheel 212 will cause the friction disc 196 to rotate, actuating the Scotch yoke to effect simple harmonic reciprocatory motion of the tongue 206 beneath the roller 40.

Figure 11:
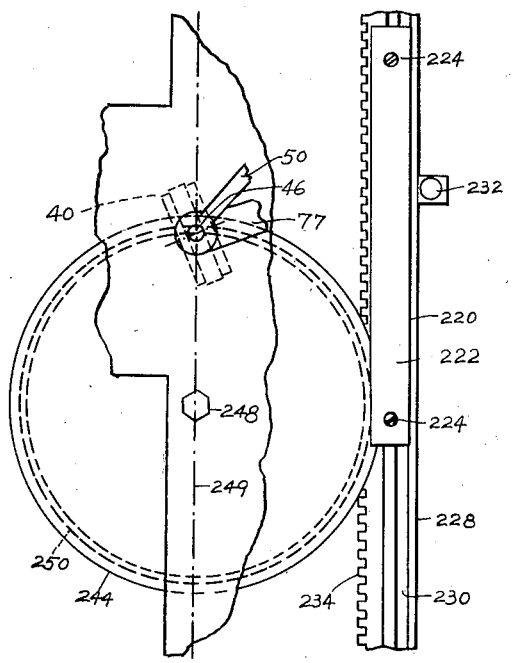
Figure 11 is a fragmentary plan view of the apparatus with an attachment for integrating the product of two curves.
Figure 12:
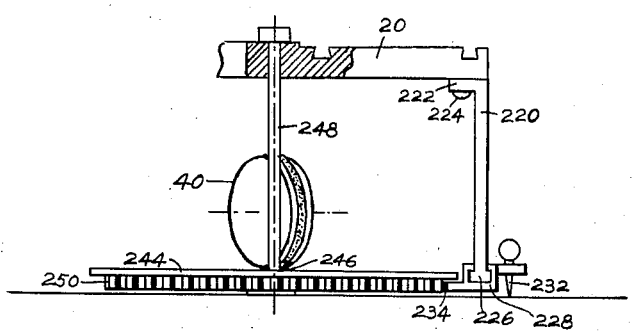
Figure 12 is a fragmentary side elevation of the apparatus with the attachment of Figure 11.
Figure 14:
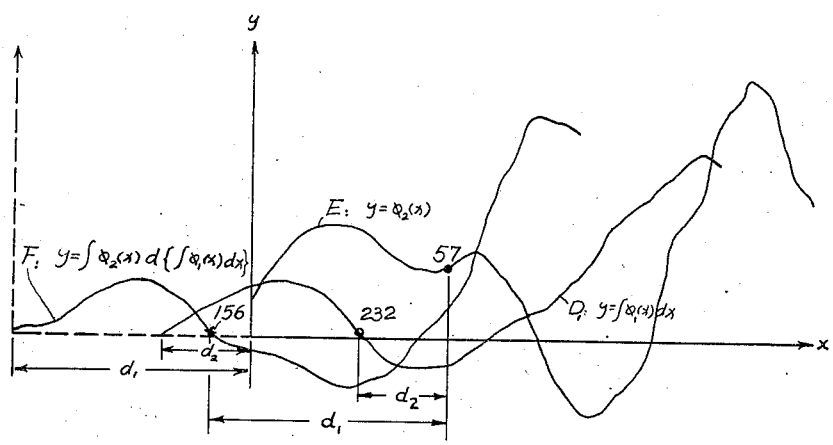
Figure 14 is a diagrammatic chart showing the curve $\int \phi_2(x) d\{\int \phi_1(x) dx\}$ derived from the curves $\int \phi_1(x) dx$ (see Figure 13 and $y = \phi_2(x)$, using the apparatus as modified by the attachment of Figures 11 and 12.

In the attachment shown in Figures 11 and 12, there is provided a bracket 220 having an attachment flange 222 secured to the frame 20 by screws as at 224. The bracket along its lower edge is provided with a rail head section 226 on which is slidably moved a bar 228, having a groove 230 in its upper edge, complementary to the rail head, so that the bar 228 is constrained to move freely and transversely of the frame 20 and perpendicularly to the $x$ axis and the direction of frame travel. The bar 228 is provided with a tracing stylus 232, which is adapted to be moved along a curve such as E. (See Figure 14.)

One edge of the bar 228 is provided with rack teeth 234, which engage with the teeth of a gear 250.

A circular disc 244 is mounted beneath the frame 20, the same being journalled as at 246 on the lower end of a stub shaft 248, depending from and rigidly secured to the frame 20. The shaft 248 is disposed laterally with respect to the axis of the shaft 46, on a line 249 extending parallel with the bar 228 and extending through the axis of the shaft 46. The disc is of sufficient diameter so that the peripheral marginal area thereof underlies the roller 40. Underneath the disc 244, is the large gear 250, the teeth of which mesh with the rack teeth 234. Thus as the bar 22 is moved, the rack teeth thereof rotate the gear 250, and in turn rotate the disc 244.

Figure 13:
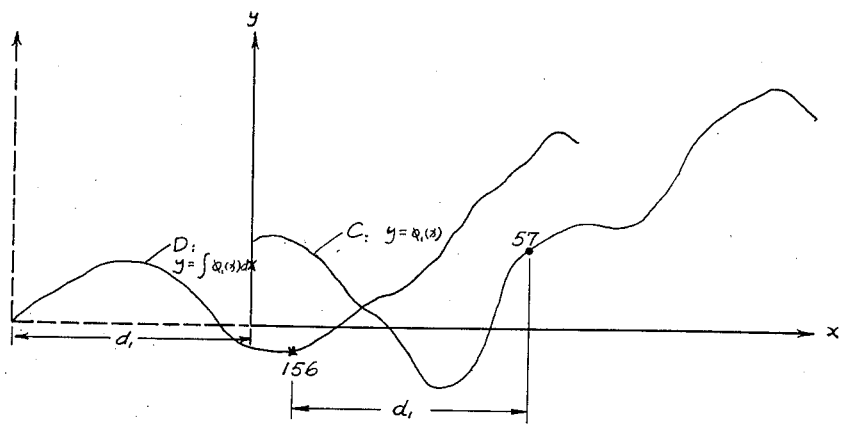
Figure 13 is a diagrammatic chart showing the curve $\int \phi_1(x) dx$ derived from a given curve $y = \phi_1(x)$.

With such apparatus the integration involving the product of $\phi_1(x)$ and $\phi_2(x)$ given by graphs can be determined. The integral $I=\int \phi_1(x)\phi_2(x)dx$ can be written as $I=\int \phi_2(x)d[\int \phi_1(x)dx]$. Mechanically, the integration is carried out in two successive steps. Figure 13 shows the first step of integration in which the output curve D for $\int \phi_1(x)dx$ has been obtained from the input curve C for $\phi_1(x)$ through use of the apparatus shown in Figures 1 and 2. For this purpose curve D is shifted along the $x$ axis to allow for the $x$ axis spacing between the styli 57 and 232. It will be understood that the $x$ axis spacing between the stylus 57, and marker 156 is the distance indicated by $d_1$, so that corresponding points in the curves C and D are spaced by a distance $d_1$. The $x$ axis spacing between the parallel lines of movement of the styli 57 and 232 is indicated by the distance $d_2$. Accordingly the curve D will be shifted or transposed by a distance $d_1-d_2$, for proper coordination with curve E, such curve when so shifted being indicated as at D₁ in Figure 14.

The stylus 57 is caused to trace curve E simultaneously while the stylus 232 is tracing curve D₁. The mechanism acts to convert the vertical motion to motion along the $x$ axis through the conversion mechanism comprising the disc 244, so that the recording wheel 40 actuates the indicator 130 and the marker 156 to develop a new curve F which is represented by $\int \phi_1(x)\phi_2(x)dx$.

It will be understood that the stylus 57, during the operation shifts the cam, which in turn varies the angle of the wheel 40, relative to the $x$ axis so that the mechanism responds to the combined effect of the curves E and D₁, as the apparatus and the styli 57 and 232 are advanced along such curves.

The profile of the cam groove 76 which controls the angular relationship of the wheel 40 is developed analytically. An illustrative example for the construction of the cam profile shown in Figure 4 is as follows:

In the equation $$I=\int \phi(y)dA$$

by letting $\phi(y)=y$ $$I=\int y dA \text{ (moment of area)}$$

$$=\int\int y\, dy\, dx$$

$$=\int \frac{y^2}{2}dx$$

$$=K\int \frac{y^2}{2K}dx$$

$$=K\int \sin\theta\, dx$$

Where K is a scale constant; and $$\sin\theta=\frac{y^2}{2K}$$

By arbitrarily choosing $K=5$, the $$\theta=\sin^{-1}\frac{y^2}{10}$$

The value $\theta$ corresponding to those of $y$ can be tabulated as follows:

| $y$ (inches) | $\theta$ (degrees, minutes) |
|---|---|
| 0 | 0 |
| .5″ | 1° 25′ |
| 1″ | 5° 45′ |
| 1.5″ | 13° |
| 2″ | 23° 35′ |
| 2.5″ | 38° 40′ |
| 3.0″ | 64° 10′ |
| 3.16″ | 90° |

Referring to Figure 4, the center 300, represents the axis of the shaft 46, and the radius lines 302, 304 and 306 etc. are laid out at the angles above tabulated. The semi-circle 308 represents the effective length of the arm 77. The $y$ axis 310 represents the line of movement of the pin 64, and is spaced from the center 300 a corresponding $x$ axis distance. The values for $y$, corresponding to the table above are laid out along the $y$ axis. The radii 304 represents the angle 38°40′, which corresponds to a value of $y$ which is 2½ inches. By drawing the parallelogram formed by the $y$ axis 310, the line 312, and the lines 314 and 316, parallel to the $y$ axis and line 312 respectively, the point 318 for the cam profile 76 is determined. By similar procedure, the other points such as 320 can be determined, point 320 being fixed by the parallelogram having the line 322 extending from the radius 64°10′ to the corresponding value of $y$ which is 3″, and the $y$ axis 310 as two of its sides, the other sides being the lines 324 and 326. The profile, being symmetrical about the axis 328, is completed after the lower half is developed in accordance with the foregoing procedure.

In using the apparatus of Figures 7–10, to evaluate Fourier coefficients from a given periodic curve, the rack 150 and the pinion 148 can be removed, before attachment of the apparatus to the frame 20, and readings will be taken directly from the indicators 130 and 140. As the carriage is moved along the board, the scotch yoke moves the tongue 206 with simple harmonic motion, in accordance with the gear ratios established by interchangeable gears 208 and 210, and the setting of the friction wheel 212 on the shaft 186. The stylus 57 traces the curve which is desired to be analyzed, and as the carriage is moved for this purpose, the scotch yoke introduces motion which causes rotation of the wheel 40, the component of the motion being dependent upon the angle $\theta$, between the axis of the wheel and the $x$ axis.

Any curve can be represented by a Fourier series $$f(x) = \frac{A_0}{2} + \sum_{n=1}^{\infty} A_n \cos \frac{2n\pi x}{\lambda} + \sum_{n=1}^{\infty} B_n \sin \frac{2n\pi x}{\lambda}$$

where:

$$A_0 = \frac{2}{\lambda} \int_0^\lambda f(x) dx$$

$$A_n = \frac{2}{\lambda} \int_0^\lambda f(x) \cos \frac{2n\pi x}{\lambda} dx$$

$$= \frac{1}{n\pi R} \int_0^\lambda f(x) d\left(R \sin \frac{2n\pi x}{\lambda}\right)$$

$$B_n = \frac{2}{\lambda} \int_0^\lambda f(x) \sin \frac{2n\pi x}{\lambda} dx$$

$$= \frac{1}{n\pi R} \int_0^\lambda f(x) d\left(R \cos \frac{2n\pi x}{\lambda}\right)$$

in which $\lambda$ is the wave length of the periodic curve, and R is the radius of the pin 200, and $n$ is equal to 1, 2, 3 or any integer. By adjusting the friction wheel 212 on the shaft 186, to provide a suitable drive ratio to the friction disc 196, and selecting a suitable gear ratio between gears 208 and 210, it is possible to cause the disc 196 to rotate $n$ revolutions while friction wheel 190 covers one wave length $\lambda$. When the tracing pen 57 moves along the curve a distance $x$, rotation of the wheel 190 causes disc 196 to rotate through an angular displacement of $$\frac{2n\pi x}{\lambda}$$

The scotch yoke undergoes a longitudinal displacement of $$x = R \cos \frac{2n\pi x}{\lambda}$$

or $$R \sin \frac{2n\pi x}{\lambda}$$

depending on whether the radius R to the pin 200 starts from a position parallel to or perpendicular to the $x$ axis, or direction of movement of the carriage. Using a cam 76, the profile of which has been developed for evaluating area $I_1 = \int dA = \int y dx$, the integrals $$\int_0^\lambda f(x) d\left(R \cos \frac{2n\pi x}{\lambda}\right) \text{ and } \int_0^\lambda f(x) d\left(R \sin \frac{2n\pi x}{\lambda}\right)$$

can easily be found. The $\int f(x) dx$ can be determined without the attachment of Figures 7–10.

In connection with the integration performed by the apparatus when provided with the converting attachment of Figures 11 and 12, the evaluation of $$I_2 = \int \phi_2(x) \phi_1(x) dx$$

is determined by transforming the above integral into $$I_2 = \int \phi_2(x) d\{\int \phi_1(x) dx\}$$

the bracketed expression being the integration $$y = \int \phi_1(x) dx$$

shown in Figure 13 (curve D). The two curves $\phi_2(x)$ (curve E) and $y = \int \phi_1(x) dx$ (curves $D_1$ Figure 14; also curve D Figure 13) or placed on the same $x$ axis with their origins offset by the distance $d_2$, from $y$ axis, Figure 14, as previously referred to.

Although several embodiments of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In an integrator, in combination, a carriage adapted to be moved rectilinearly along the $x$ axis of a chart, an integrating wheel adapted to frictionally engage the chart, said wheel being fixed to a horizontal shaft, a bracket for said shaft having a vertical stem pivotally mounted in said carriage, the axis of such stem lying in the plane of said wheel, a slide mounted on said carriage having means for constraining the movement thereof in a direction perpendicular to said $x$ axis, means for imparting movement to said slide in accordance with a curve on the chart, as the carriage is moved along the $x$ axis, a cam plate secured to said slide having a cam, means cooperating with said cam for angularly shifting the axis of said integrating wheel by the lateral movement of said cam, said cam being analytically derived from the integral $\int \phi(y) dA$, where $dA$ is a differential area within a given curve and $\phi(y)$ is an analytic function of $y$ and in reference to said means, and means for indicating the rotation of said wheel.

2. In an integrator, in combination, a carriage adapted to be moved rectilinearly along the $x$ axis of a chart, an integrating wheel adapted to frictionally engage the chart, said wheel being fixed to a horizontal shaft, a bracket for said shaft having a vertical stem pivotally mounted in said carriage, the axis of such stem lying in the plane of contact of said wheel with the chart, a slide mounted on said carriage having means for constraining the movement thereof in a direction perpendicular to said $x$ axis, means for imparting movement to said slide in accordance with a curve on the chart, as the carriage is moved along the $x$ axis, a cam plate secured to said slide having a cam, means cooperating with said cam for angularly shifting the axis of said integrating wheel by the lateral movement of said cam said cam being analytically derived from the integral $\int \phi(y) dA$, where $dA$ is a differential area within a given curve and $\phi(y)$ is an analytic function of $y$ and in reference to said means, planetary gearing associated with said bracket and carriage and driven by said wheel for transmitting the rotation of said wheel to a frame mounted indicator, irrespective of the angular movement of said frame, and an indicator on said frame driven by said planetary gearing.

3. In an integrator, in combination, a carriage adapted to be moved rectilinearly along the $x$ axis of a chart, an integrating wheel adapted to frictionally engage the chart, said wheel being fixed to a horizontal shaft, a bracket for said shaft having a vertical stem pivotally mounted in said carriage, the axis of such stem lying in the plane of contact of said wheel with the chart, a slide mounted on said carriage having means for constraining the movement thereof in a direction perpendicular to said $x$ axis, means for imparting movement to said slide in accordance with a curve on the chart, as the carriage is moved along the $x$ axis, a cam plate secured to said slide having a cam, means cooperating with said cam for angularly shifting the axis of said integrating wheel by the lateral movement of said cam, said cam being analytically derived from the integral $\int \phi(y) dA$ where $dA$ is a differential area within a given curve and $\phi(y)$ is an analytic function of $y$ and in reference to said means, planetary gearing associated with said bracket and carriage and driven by said wheel for transmitting the rotation of said wheel to a frame mounted indicator, irrespective of the angular movement of said frame, a curve plotting device for plotting a curve on said chart mounted on said carriage and adapted to move transversely of the carriage, and means including said planetary gearing for moving said plotting device in accordance with the rotation of said wheel.

4. In an integrator, in combination, a carriage adapted to be moved rectilinearly along the x axis of a chart, an integrating wheel adapted to frictionally engage the chart, said wheel being fixed to a horizontal shaft, a bracket for said shaft having a vertical stem pivotally mounted in said carriage, the axis of such stem lying in the plane of contact of said wheel with the chart, a slide mounted on said carriage having means for constraining the movement thereof in a direction perpendicular to said x axis, means for imparting movement to said slide in accordance with a curve on the chart, as the carriage is moved along the x axis, a cam plate secured to said slide having a cam, means cooperating with said cam for angularly shifting the axis of said integrating wheel by the lateral movement of said cam, said cam being analytically derived from the integral $\int\phi(y)dA$, where $dA$ is a differential area within a given curve and $\phi(y)$ is an analytic function of $y$ and in reference to said means, a curve plotting device for plotting a curve on said chart mounted on said carriage and adapted to move transversely of the carriage, and means for moving said plotting device in accordance with the rotation of said wheel.

5. In an integrator, in combination, a carriage adapted to be moved rectilinearly along the x axis of a chart, an integrating wheel adapted to frictionally engage the chart, said wheel being fixed to a horizontal shaft, a bracket for said shaft having a vertical stem pivotally mounted in said carriage, the axis of such stem lying in the plane of contact of said wheel with the chart, a slide mounted on said carriage having means for constraining the movement thereof in a direction perpendicular to said x axis, means for imparting movement to said slide in accordance with a curve on the chart, as the carriage is moved along the x axis, a cam plate secured to said slide having a cam, means cooperating with said cam for angularly shifting the axis of said integrating wheel by the lateral movement of said cam, said cam being analytically derived from the integral $\int\phi(y)dA$, where $dA$ is a differential area within a given curve and $\phi(y)$ is an analytic function of $y$ and in reference to said means, a helical resistor element coupled to said wheel for rotation therewith, and contact means in contact with and movable by rotation of said helical element, for varying the length of said element, and a connection to one end of said element, whereby to provide a variable resistance for electrically indicating the rotation of said wheel.

6. In an integrator, in combination, a carriage adapted to be moved rectilinearly along the x axis of a chart, an integrating wheel adapted to frictionally engage the chart, said wheel being fixed to a horizontal shaft, a bracket for said shaft having a vertical stem pivotally mounted in said carriage, the axis of such stem lying in the plane of contact of said wheel with the chart, a slide mounted on said carriage having means for constraining the movement thereof in a direction perpendicular to said x axis, means for imparting movement to said slide in accordance with a curve on the chart, as the carriage is moved along the x axis, a cam plate secured to said slide having a cam, means cooperating with said cam for angularly shifting the axis of said integrating wheel by the lateral movement of said cam, said cam being analytically derived from the integral $\int\phi(y)dA$, where $dA$ is a differential area within a given curve and $\phi(y)$ is an analytic function of $y$ and in reference to said means, a helical resistor element coupled to said wheel for rotation therewith, and liquid contact pools mounted adjacent said element, one of said pools being adapted to contact an end of said element, and the other being adapted to be moved along said element, in contact therewith, whereby to provide a variable resistance for electrically indicating the rotation of said wheel.

7. In an integrator, in combination, a carriage adapted to be moved rectilinearly along the x axis of a chart, an integrating friction wheel mounted on said carriage, said wheel being fixed to a horizontal shaft, a bracket for said shaft having a vertical stem pivotally mounted in said carriage, the axis of such stem lying in the plane of said wheel, a slide mounted on said carriage having means for constraining the movement thereof in a direction perpendicular to said x axis, means for imparting movement to said slide in accordance with a curve on the chart, as the carriage is moved along the x axis, a cam plate secured to said slide having a cam, means cooperating with said cam for angularly shifting the axis of said integrating wheel by the lateral movement of said cam, said cam being analytically derived from the integral $\int\phi(y)dA$, where $dA$ is a differential area within a given curve and $\phi(y)$ is an analytic function of $y$ and in reference to said means, means for indicating the rotation of said wheel, a tongue lying substantially in the plane of said chart, and underlying said wheel, and means responsive to the movement of the carriage for moving said tongue in the direction of the x axis with simple harmonic motion.

8. In an integrator, in combination, a carriage adapted to be moved rectilinearly along the x axis of a chart, an integrating friction wheel mounted on said carriage wheel, said wheel being fixed to a horizontal shaft, a bracket for said shaft having a vertical stem pivotally mounted in said carriage, the axis of such stem lying in the plane of said wheel, a slide mounted on said carriage having means for constraining the movement thereof in a direction perpendicular to said x axis, means for imparting movement to said slide in accordance with a curve on the chart, as the carriage is moved along the x axis, a cam plate secured to said slide having a cam, means cooperating with said cam for angularly shifting the axis of said integrating wheel by the lateral movement of said cam, said cam being analytically derived from the integral $\int\phi(y)dA$, where $dA$ is a differential area within a given curve and $\phi(y)$ is an analytic function of $y$ and in reference to said means, means for indicating the rotation of said wheel, means mounted on said carriage for movement transversely thereof and having means for imparting movement thereto in accordance with a second curve on the chart, a friction disc mounted on said frame for rotation on a vertical axis, laterally disposed with respect to the axis of said stem and disposed in a plane adjacent to said chart, with its peripheral edge underlying said wheel, and means for rotating said disc in response to movement of said last named transversely movable means.

9. In an integrator, in combination, a carriage adapted to be moved rectilinearly along the x axis of a chart, and integrating friction wheel mounted on said carriage, said wheel being fixed to a horizontal shaft, a bracket for said shaft having a vertical stem pivotally mounted in said carriage, the axis of such stem lying in the plane of said wheel, a slide mounted on said carriage having means for constraining the movement thereof in a direction perpendicular to said x axis, means for imparting movement to said slide in accordance with a curve on the chart, as the carriage is moved along the x axis, a cam plate secured to said slide having a cam, means cooperating with said cam for angularly shifting the axis of said integrating wheel by the lateral movement of said cam, said cam being analytically derived from the integral $\int\phi(y)dA$, where $dA$ is a differential area within a given curve and $\phi(y)$ is an analytic function of $y$ and in reference to said means, planetary gearing associated with said bracket and carriage and driven by said wheel for transmitting the rotation of said wheel to a frame mounted indicator, irrespective of the angular movement of said frame, a curve plotting device for plotting a curve on said chart mounted on said carriage and adapted to move transversely of the carriage, means for moving said plotting device in response to rotation of said wheel, means mounted on said carriage for movement transversely thereof and having means for imparting movement thereto in accordance with a second curve on the chart, a friction disc mounted on said frame for rotation on a vertical axis, laterally disposed with respect to the axis of said stem and disposed in a plane adjacent to said chart, with its peripheral edge underlying said wheel, and means for rotating said disc in response to movement of said last named transversely movable means.

References Cited in the file of this patent

UNITED STATES PATENTS

| | | |
|---|---|---|
| 1,205,068 | Weymouth | Nov. 14, 1916 |
| 1,503,824 | Fry | Aug. 5, 1924 |
| 1,748,783 | McGaughy | Feb. 25, 1930 |
| 1,887,593 | Guman | Nov. 15, 1932 |